US012358151B2

United States Patent
Moriyama et al.

(10) Patent No.: US 12,358,151 B2
(45) Date of Patent: Jul. 15, 2025

(54) ROBOT CONTROL SYSTEM AND CONTROL DEVICE

(71) Applicant: JOHNAN Corporation, Uji (JP)

(72) Inventors: Kozo Moriyama, Kyoto (JP); Shin Kameyama, Kyoto (JP); Truong Gia Vu, Kyoto (JP); Lucas Brooks, Kyoto (JP)

(73) Assignee: JOHNAN CORPORATION, Kyoto (JP)

( * ) Notice: Subject to any disclaimer, the term of this patent is extended or adjusted under 35 U.S.C. 154(b) by 237 days.

(21) Appl. No.: 18/246,498

(22) PCT Filed: Mar. 4, 2022

(86) PCT No.: PCT/JP2022/009343
§ 371 (c)(1),
(2) Date: Mar. 23, 2023

(87) PCT Pub. No.: WO2022/209578
PCT Pub. Date: Oct. 6, 2022

(65) Prior Publication Data
US 2023/0339119 A1  Oct. 26, 2023

(30) Foreign Application Priority Data
Mar. 31, 2021 (JP) .................. 2021-060233

(51) Int. Cl.
*B25J 9/16* (2006.01)
*B25J 13/08* (2006.01)

(52) U.S. Cl.
CPC .................. *B25J 9/1697* (2013.01)

(58) Field of Classification Search
CPC .............. B25J 9/1697; B25J 13/08; G05B 2219/39039; G05B 2219/39057; G05B 2219/40202; G05B 2219/40607
USPC ............... 700/245–264; 318/568.11–568.25
See application file for complete search history.

(56) References Cited

U.S. PATENT DOCUMENTS

| 10,486,307 | B2 * | 11/2019 | Wang | B25J 9/1697 |
|---|---|---|---|---|
| 10,960,550 | B2 * | 3/2021 | Namiki | G06N 3/08 |
| 11,254,005 | B2 * | 2/2022 | Yoshida | B25J 9/1676 |
| 11,645,531 | B2 * | 5/2023 | Moore | A61B 17/1604 |
| | | | | 345/419 |

(Continued)

FOREIGN PATENT DOCUMENTS

| JP | 2004-213673 | 7/2004 |
|---|---|---|
| JP | 2007-216350 | 8/2007 |

(Continued)

OTHER PUBLICATIONS

International Search Report and Written Opinion of PCT/JP2022/009343, May 24, 2022, 10 pages including English translation of the International Search Report.

*Primary Examiner* — Jaime Figueroa
(74) *Attorney, Agent, or Firm* — HSML P.C.

(57) ABSTRACT

Provided is a robot control system (1) including a robot (200), at least one first camera (300) attached or fixed to the robot, a second camera (400) attached to a worker, and a control device (100). The control device controls the robot by specifying a position of a workpiece W or a component, or a skeletal posture or states of a worker based on an image of the first camera and an image of the second camera.

3 Claims, 8 Drawing Sheets

(56) References Cited

U.S. PATENT DOCUMENTS

| | | | |
|---|---|---|---|
| 2003/0180697 A1* | 9/2003 | Kim | G09B 23/28 |
| | | | 434/365 |
| 2004/0189675 A1 | 9/2004 | Pretlove et al. | |
| 2010/0185327 A1 | 7/2010 | Nakajima et al. | |
| 2014/0067317 A1* | 3/2014 | Kobayashi | G05D 3/00 |
| | | | 702/153 |
| 2016/0270867 A1* | 9/2016 | Scholan | A61B 34/70 |
| 2017/0206710 A1 | 7/2017 | Touma et al. | |
| 2017/0320210 A1* | 11/2017 | Ding | B25J 9/1661 |
| 2018/0099408 A1 | 4/2018 | Shibata | |
| 2018/0126558 A1 | 5/2018 | Ooba | |
| 2018/0326584 A1* | 11/2018 | Wang | B25J 9/1664 |
| 2019/0099892 A1* | 4/2019 | Namiki | B25J 19/021 |
| 2019/0184582 A1 | 6/2019 | Namiki | |
| 2020/0114512 A1* | 4/2020 | Yoshida | B25J 19/023 |
| 2020/0198148 A1* | 6/2020 | Ueno | B25J 9/1697 |
| 2020/0337776 A1* | 10/2020 | Saun | F16M 13/04 |
| 2021/0252713 A1* | 8/2021 | Mimura | B25J 9/1697 |

FOREIGN PATENT DOCUMENTS

| | | | | |
|---|---|---|---|---|
| JP | 2017-094466 | | 6/2017 | |
| JP | 2017-177181 | | 10/2017 | |
| JP | 2017177181 A | * | 10/2017 | |
| JP | 2018-058178 | | 4/2018 | |
| JP | 2018-062016 | | 4/2018 | |
| JP | 2019038075 A | * | 3/2019 | B25J 13/00 |
| JP | 2019-113895 | | 7/2019 | |

* cited by examiner

[Fig.1]
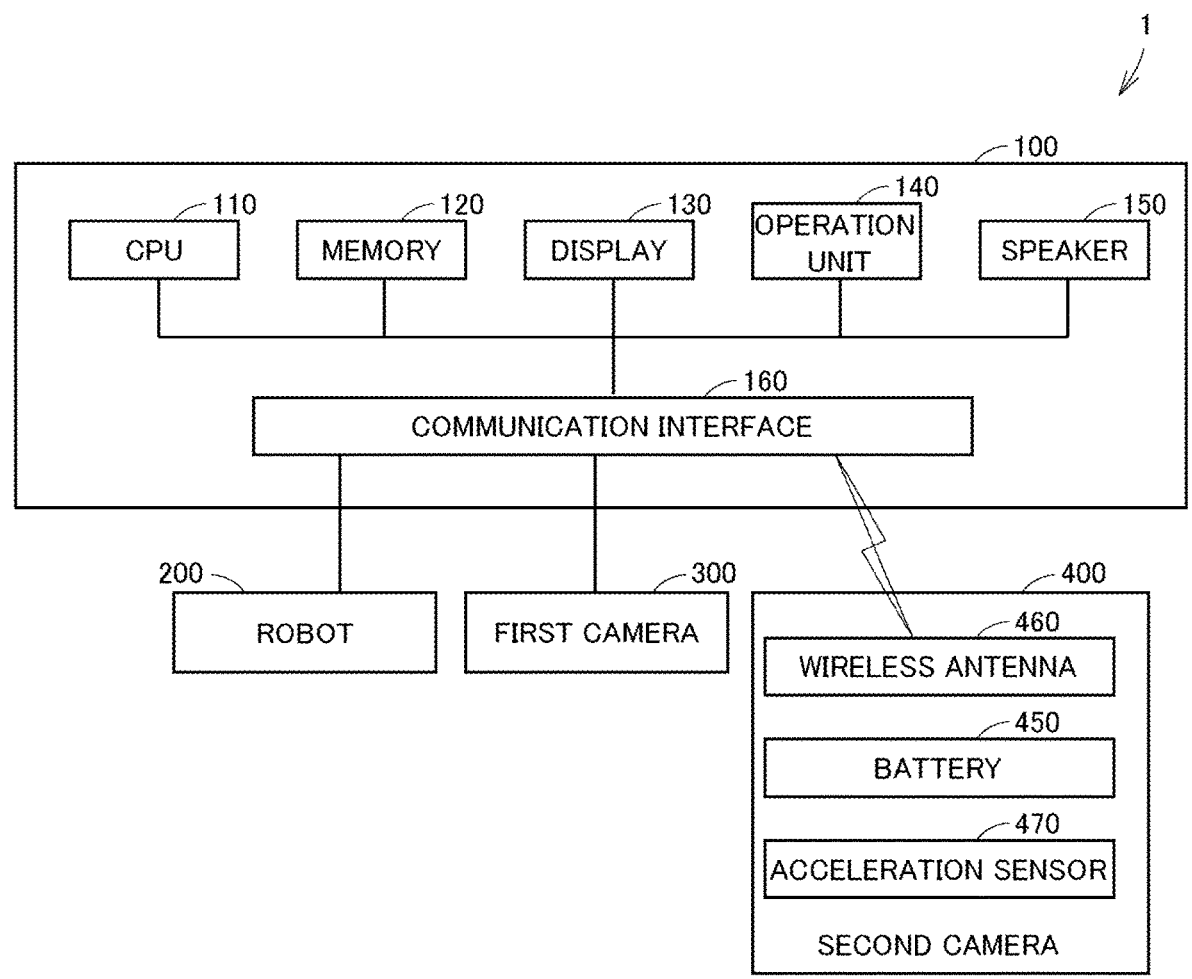

[Fig.2]
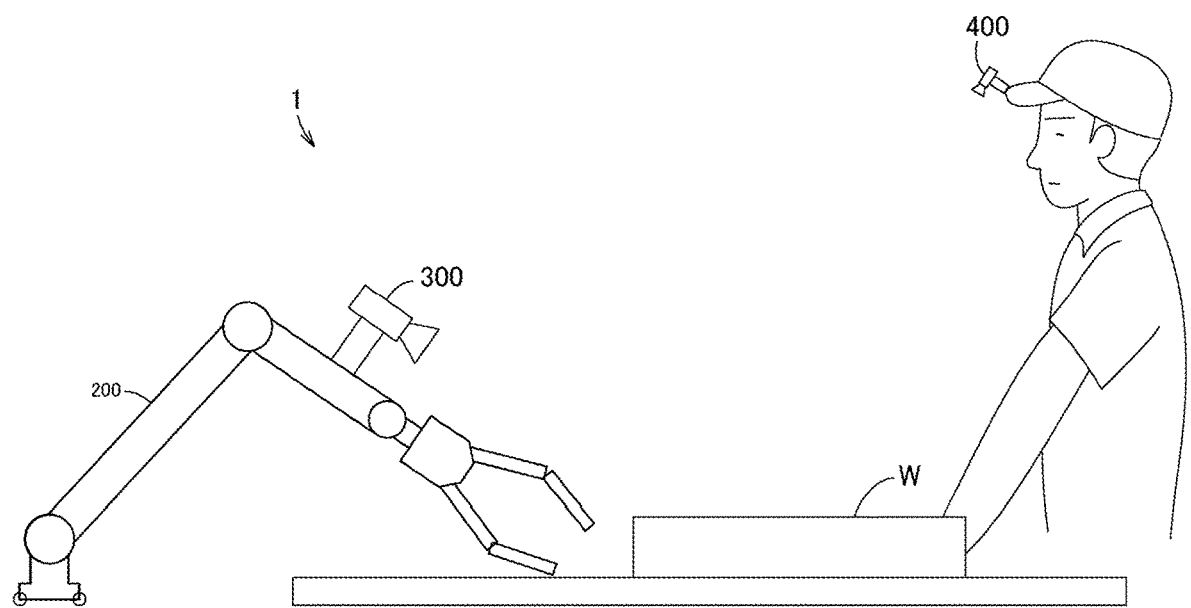

[Fig.3]
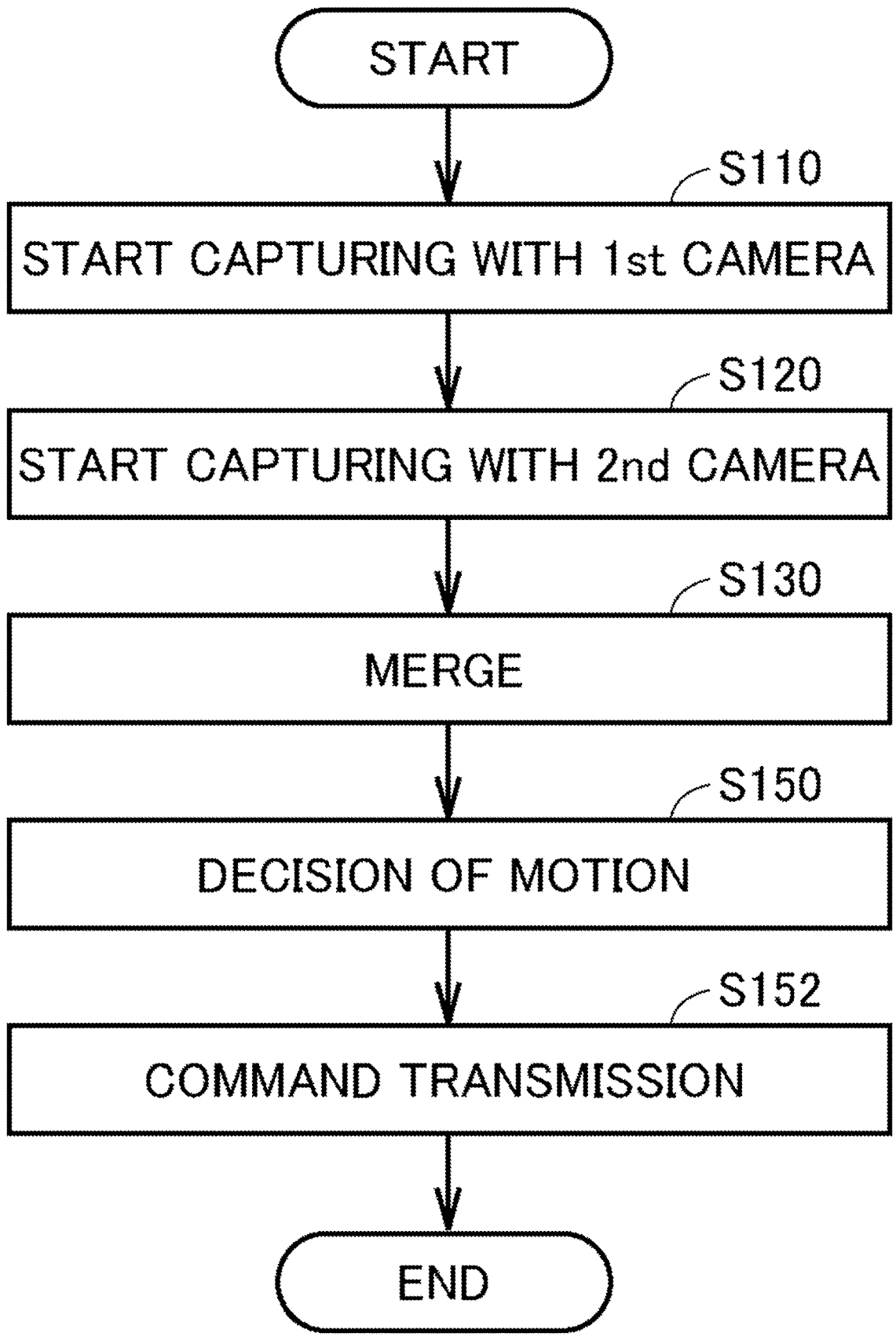

[Fig.4]
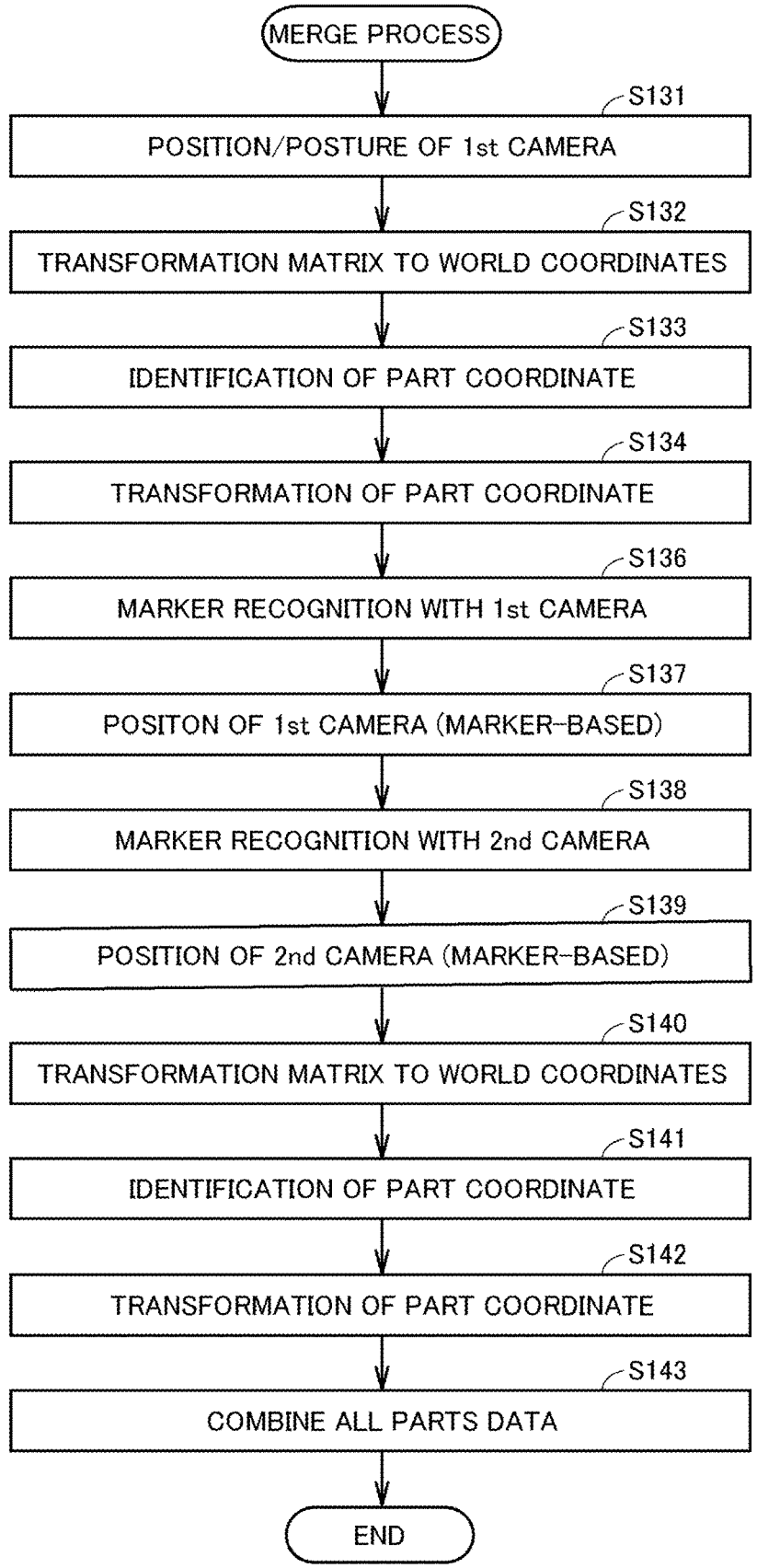

[Fig.5]
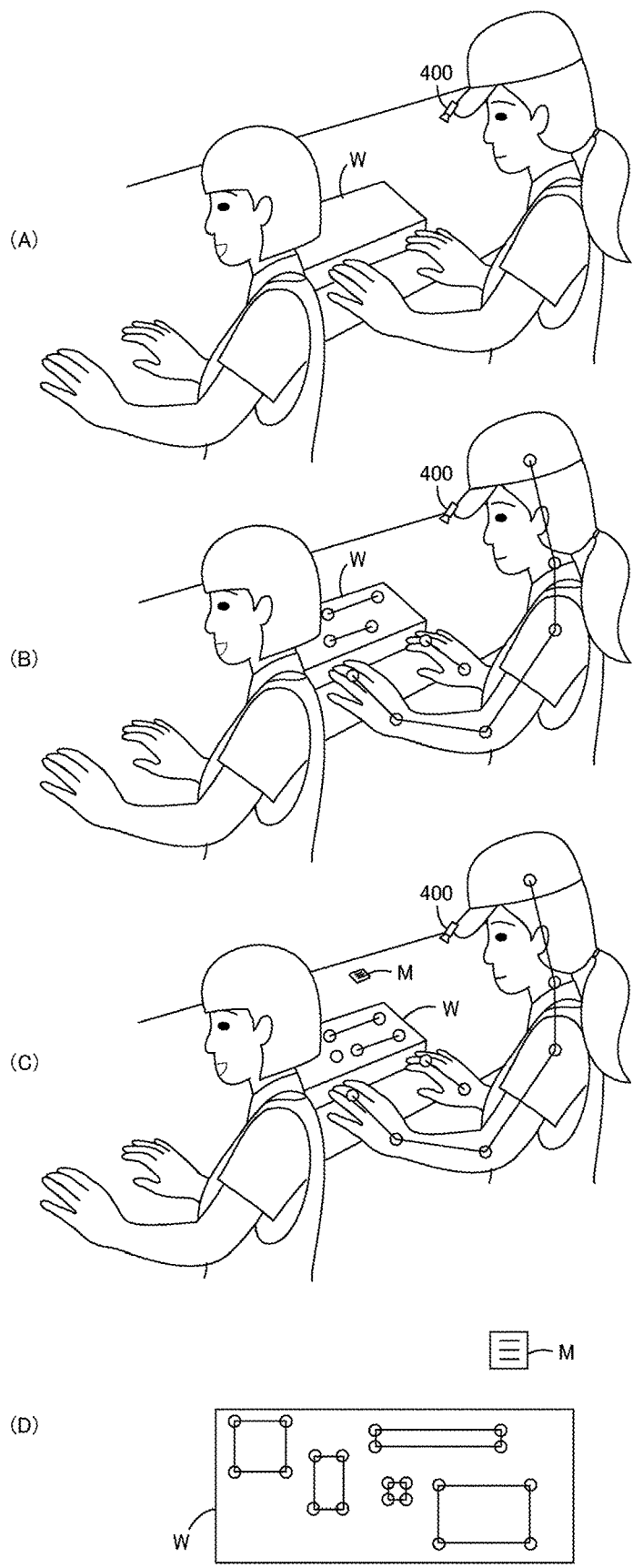

[Fig.6]
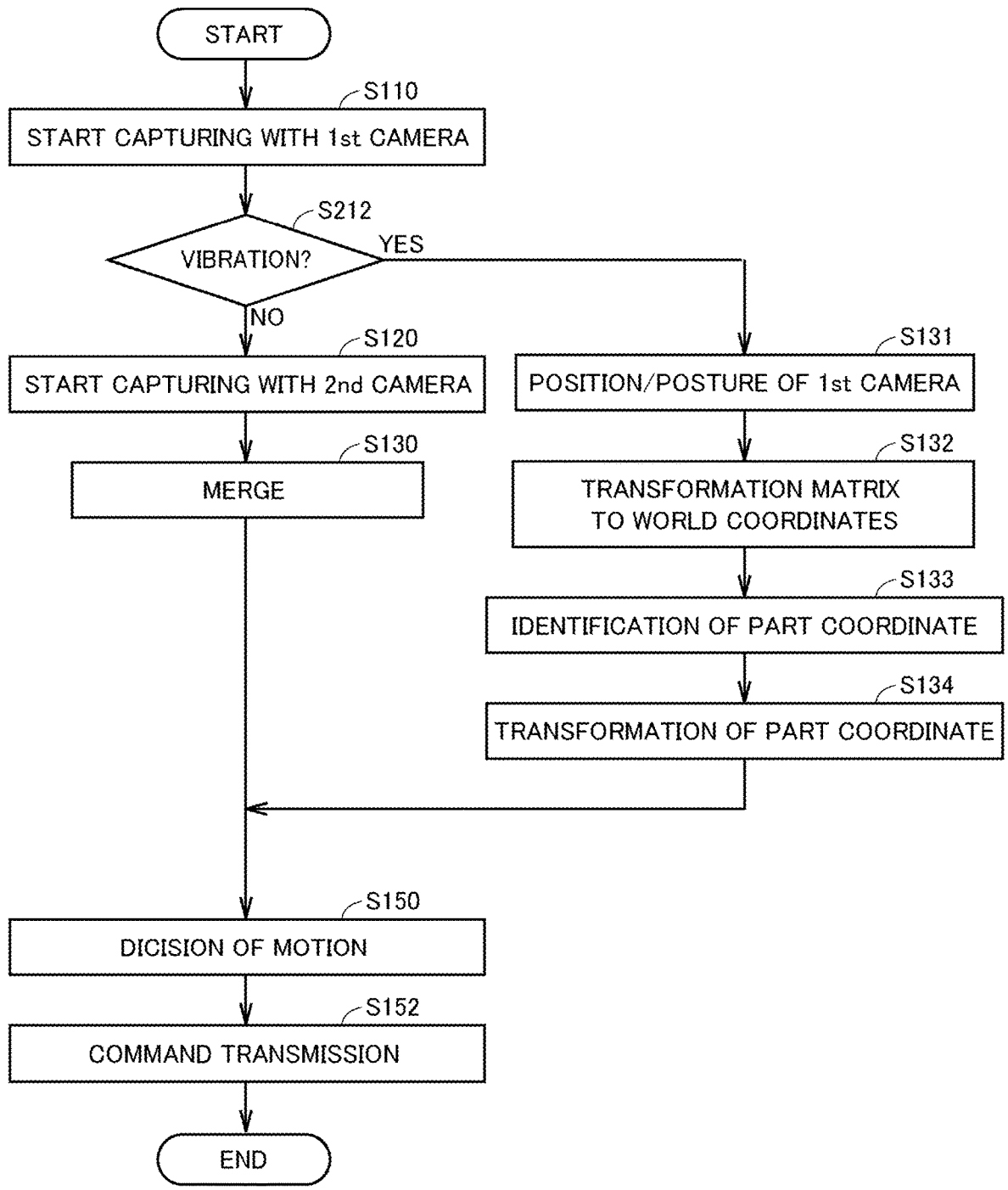

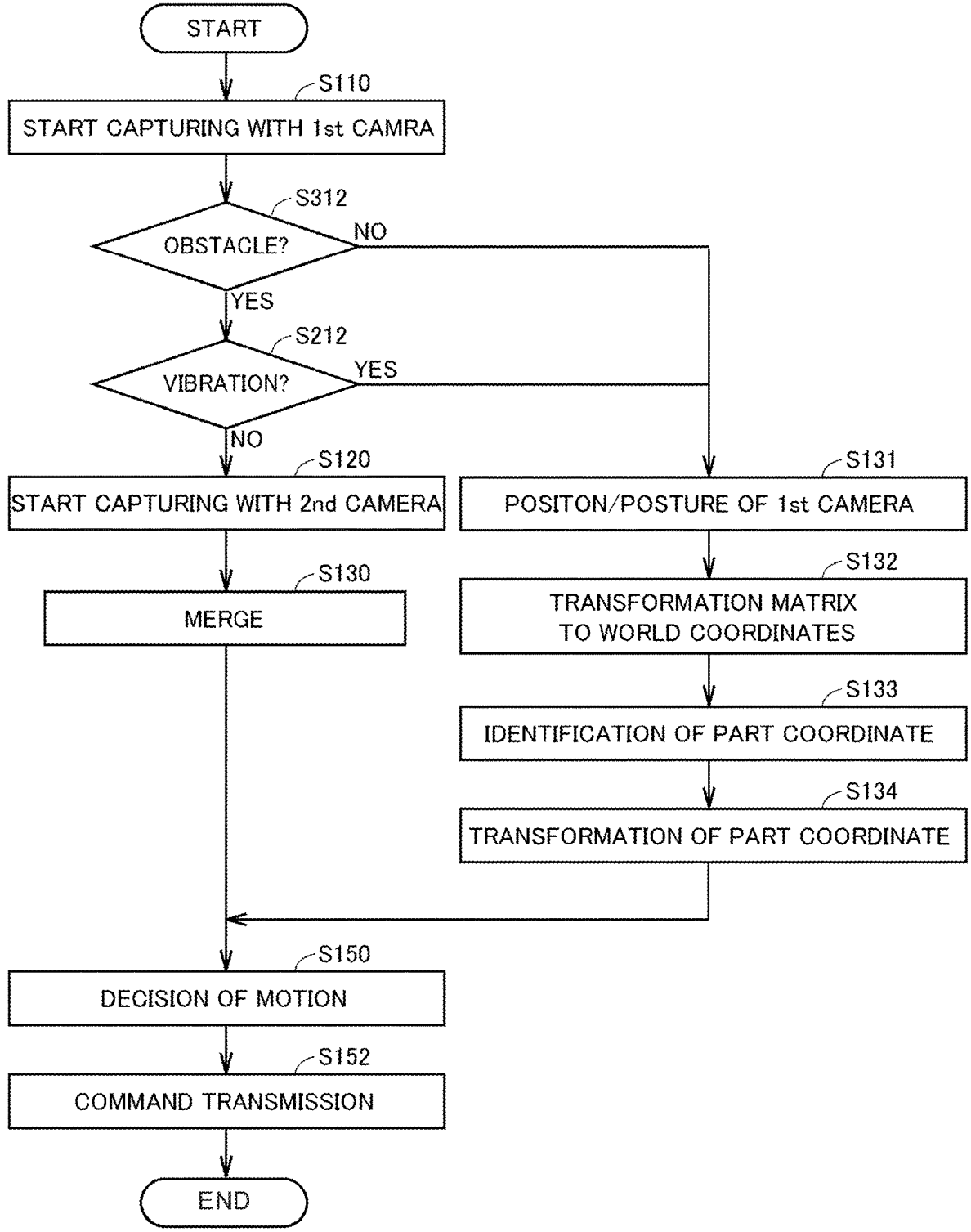

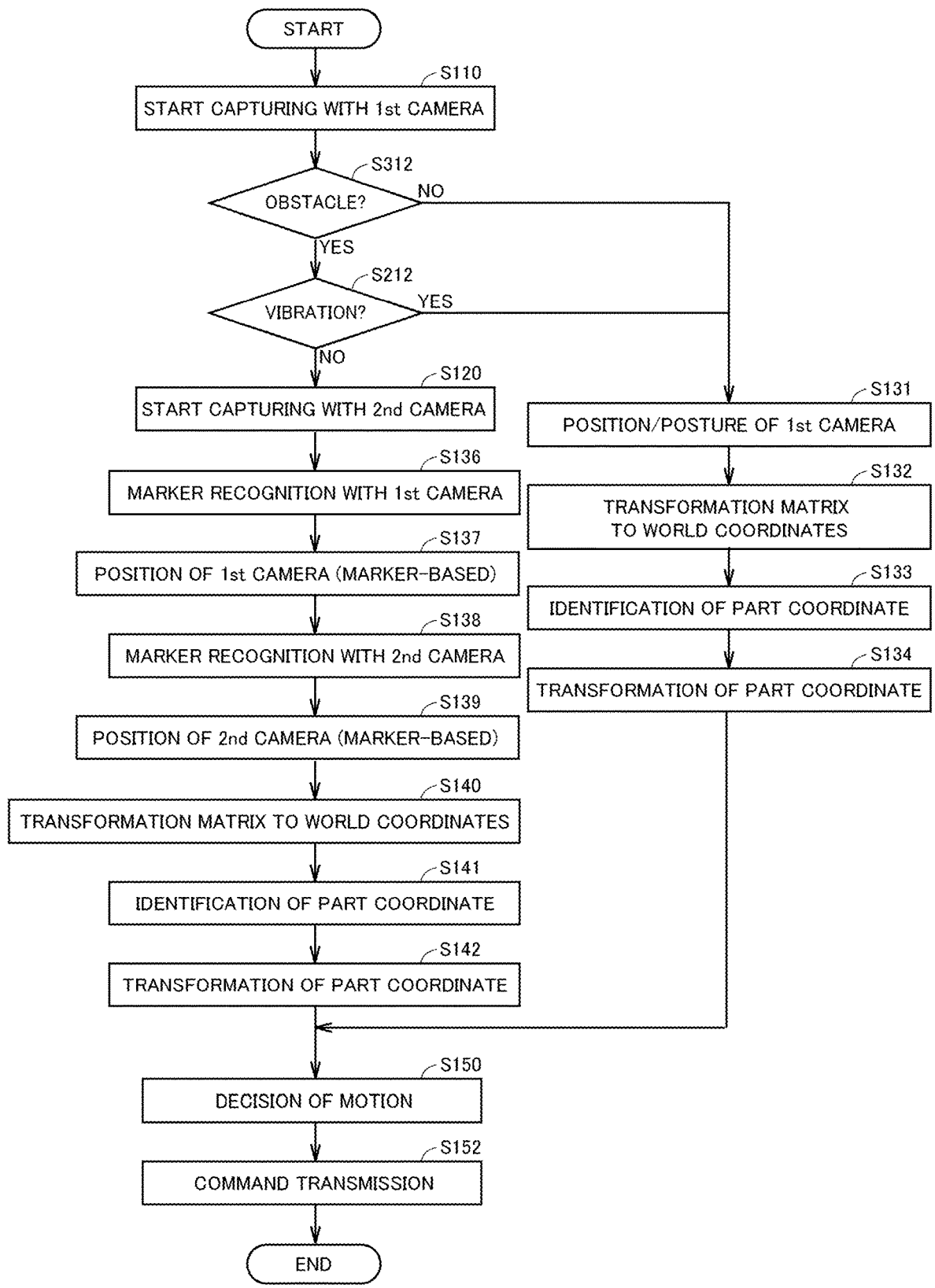

ROBOT CONTROL SYSTEM AND CONTROL DEVICE

TECHNICAL FIELD

The present invention relates to a technology for various robot control systems, and more particularly to a technology for controlling a robot based on images captured by a camera.

BACKGROUND ART

A technology for controlling a robot based on images captured by cameras have been known. For example, JP-A-2018-58178 (PTL 1) discloses a work assisting system including a machine learning unit. According to PTL 1, provided is a work assisting system comprising: a sensor unit that detects a position and an orientation of at least one body part of a worker; a supply unit that supplies a part or a tool to the worker; and a cell controller that controls the supply unit, the cell controller comprising: a machine learning unit that constructs a model by learning a work status of the worker on the basis of the detected position and orientation, and a work status determining unit that determines the work status of the worker by using the constructed model, wherein the supply unit selects the part or tool on the basis of the determined work status and changes the position and orientation of the part or tool on the basis of the position and orientation of the at least one body part.

CITATION LIST

Patent Literature

PTL 1: JP-A-2018-58178

SUMMARY OF INVENTION

Technical Problem

An object of the present invention is to provide a technology for reducing the problem that a proper image which covers a required area cannot be acquired.
Solution to Problem According to an aspect of the invention, there is provided a robot control system that includes a robot, at least one first camera attached or fixed to the robot, a second camera attached to a worker and a control device. The control device determines a work situation by specifying a position of a workpiece or a component, or a skeletal posture or states of the worker based on an image of the first camera and an image of the second camera and controls the robot according to the situation.
Advantageous Effects of Invention As described above, according to the present invention, it is possible to reduce the problem that a proper image which covers a required area cannot be acquired.

BRIEF DESCRIPTION OF THE DRAWINGS

FIG. 1 is a block diagram representing an overall configuration of a robot control system according to First Embodiment.

FIG. 2 is an image diagram representing a state of capturing images by a robot camera and a wearable camera according to First Embodiment.

FIG. 3 is a flowchart representing information processing for robot control according to First Embodiment.

FIG. 4 is a flowchart representing merge processing according to First Embodiment.

FIG. 5 is an image diagram representing a merge processing method according to First Embodiment.

FIG. 6 is a flowchart representing information processing for robot control according to Second Embodiment.

FIG. 7 is a flowchart representing information processing for robot control according to Third Embodiment.

FIG. 8 is a flowchart representing information processing for robot control according to Fourth Embodiment.

DESCRIPTION OF EMBODIMENTS

The following describes embodiments of the present invention with reference to the accompanying drawings. In the following descriptions, like elements are given like reference numerals. Such like elements will be referred to by the same names, and have the same functions. Accordingly, detailed descriptions of such elements will not be repeated.

First Embodiment

<Overall Configuration of the Robot Control System>

First, referring to FIG. 1, the overall configuration of a robot control system 1 according to this embodiment is described. The robot control system 1 includes, as main devices, a robot 200, a first camera 300, a second camera 400, and a control device 100 for controlling the motion of the robot 200 based on captured images.

The robot control system 1 according to the present embodiment is applied, for example, to a production site in a factory, and is configured to cause the robot 200 to perform a predetermined task at the production site. Further, in the robot control system 1 according to the present embodiment, the robot 200 is not partitioned by a fence or the like, a person can access the work area of the robot 200, and the person and the robot 200 are going to proceed to work together.

The first camera 300, as shown in FIG. 2, may be a camera attached to the robot 200, or a camera fixed to a workbench, ceiling, or the like. The first camera 300 captures an object placed on the workbench, that is, a workpiece W, components, and/or a worker working there.

The second camera 400, as shown in FIG. 2, is a so-called wearable camera that is attached to the worker's body, work clothes, eyeglasses, a work cap, a helmet, or the like. It is preferable that the workpiece W, components, and/or body parts such as the worker's own hands and arms fall within the field of view of the second camera 400 while the worker is working.

Returning to FIG. 1, the control device 100 causes the robot 200 to perform various tasks based on images captured by the first camera 300 and the second camera 400. A task may be, for example, a process of moving a workpiece at a certain point to another point, or a process of handing over a tool suitable for the workpiece W to a worker.

The Control device 100 mainly includes a CPU 110, a memory 120, a display 130, an operation unit 140, a speaker 150 and a communication interface 160. The CPU 110 controls each part of the robot 200 and the control device 100 by executing programs stored in the memory 120. For example, the CPU 110 executes a program stored in the memory 120 and refers to various data to perform various types of information processing, which will be described later.

The memory 120 is implemented by various RAMs, various ROMs, and the like. The memory 120 stores programs executed by the CPU 110, such as the task of the robot 200, and data generated by the execution of the programs by the CPU 110, such as the operating state, the current position and the posture, and the target position of the robot 200.

The display 130 displays texts and images based on signals from the CPU 110.

The operation unit 140 receives instructions from the user and inputs them to the CPU 110.

The speaker 150 outputs various sounds based on signals from the CPU 110.

The communication interface 160 is realized by a connector, an antenna, or the like, and exchanges various data with other devices such as the robot 200, the first camera 300, and the second camera 400 via a communication cable, wireless LAN, or the like. In the present embodiment, the CPU 110 acquires an image captured by the first camera 300 via a connector as the communication interface 160 using a communication cable. The CPU 110 acquires an image captured by the second camera 400 via a wireless antenna as the communication interface 160.

In this embodiment, the second camera 400 is equipped with a wireless antenna 460 and a battery 450. The first camera 300 has connectors for signal cables and power cables, and acquires power from the robot 200 or power cables.

In this way, the CPU 110 of the control device 100, according to the robot control program in the memory 120, causes the robot 200 to perform various operations via the communication interface 160 based on images acquired from the first camera 300 and the second camera 400 via the communication interface 160.

<Overview of Robot Control System Operation>

The control device 100 controls the robot 200 by judging the working status of the worker in the working space and the status of a workpiece or components on a workbench based on the image captured by the first camera 300. In some cases, the first camera 300 cannot cover well all of the hands of the worker, the workpiece W or components on the workbench, because the body and head of the worker are in the way. Therefore, in the present embodiment, information that cannot be obtained from the image captured by the first camera 300 is complemented by the image captured by the second camera 400 attached to the worker, so that an accurate status of the workpiece can be grasped.

<Information Processing of the Control Device 100>

Information processing of the control device 100 in the present embodiment is described in detail below with reference to FIGS. 3, 4, and 5. The CPU 110 of the control device 100 reads out, for example, a program for causing the robot 200 to execute a task according to the program in the memory 120, and executes the following processing.

First, the CPU 110 starts capturing images with the first camera 300 (step S110). FIG. 5(A) shows an image captured by the first camera 300 attached to the ceiling.

The CPU 110 starts capturing images by the second camera 400 (step S120).

The CPU 110 can analyze the situation of the working space in the images captured by the first camera 300 and the images captured by the second camera 400, and can obtain analysis results in which there is less lack of information by merging the analysis results from a plurality of viewpoints (step S130). As a result, the CPU 110 can recognize information necessary for the task execution, such as the positions and postures of parts of the workpiece and/or the positions and postures of the workpiece itself and/or the posture of the worker.

Here, the merge processing (step S130) according to this embodiment is described with reference to FIG. 4.

The CPU 110 acquires where the position of the first camera 300 is set in the world coordinate system (step S131). In the case of the camera fixed to a workbench, the position and posture of the camera in the world coordinate system are determined in advance. In the case of the camera attached to the robot 200, the CPU 110 calculates the position, posture, angle of view, and the like of the camera 300 in the world coordinate system based on the position and posture of the robot 200 in the world coordinate system and the position and posture of the first camera 300 with respect to the robot 200.

The CPU 110 calculates a first transformation matrix from the coordinates viewed from the first camera 300 to the world coordinate system based on information such as the angle of view of the camera in the world coordinate system (step S132).

As shown in FIG. 5(B), the CPU 110 detects a workpiece W and components and detects the skeletal posture of the worker and the like from the two-dimensional image from the viewpoint of the first camera 300 based on the image of the first camera 300 (step S133).

For example, when using a three-dimensional camera such as an RGB-D camera, the CPU 110 adds depth information to the two-dimensional coordinates obtained above so that the three-dimensional coordinates of the workpiece W, components, and the skeletal posture of the worker can be obtained as the coordinates of the first camera 300.

When a two-dimensional camera is used, the CPU 110 can detect the same point using a plurality of the first cameras 300, 300, . . . . As a result, the three-dimensional coordinates of the workpiece W, components, and the skeletal posture of the worker can be obtained by using trigonometrical survey or the like.

Using the first transformation matrix, the CPU 110 transforms the coordinates of the workpiece W, components, and the skeletal posture of the worker from the viewpoint of the first camera 300 into the world coordinates (step S134).

For example, as shown in FIG. 5(C), the CPU 110 recognizes AR (Augmented-Reality) marker M from the image from the first camera 300 (step S136).

The CPU 110 calculates the AR marker-based position and posture of the first camera 300 based on the position and shape of the AR marker M viewed from the first camera 300 (step S137).

Then, as shown in FIG. 5(D), the CPU 110 recognizes the AR marker M from the image from the second camera 400 (step S138).

The CPU 110 calculates the AR marker-based position and posture of the second camera 400 based on the position and shape of the AR marker M viewed from the second camera 400 (step S139). Note that the position and posture of the second camera 400 with respect to the reference may be calculated via the outer frame or components of the workbench without being limited to the form using the AR marker.

The CPU 110 calculates a second transformation matrix from the coordinates viewed from the second camera 400 to the world coordinates (step S140). More specifically, the CPU 110 calculates the second transformation matrix from the first transformation matrix based on the position and posture of the second camera 400 relative to the position and posture of the first camera 300.

As shown in FIG. 5(D), the CPU 110 detects the workpiece W and components and detects the skeletal posture of the worker and the like from the two-dimensional image from the viewpoint of the second camera 400 based on the image of the second camera 400 (step S141).

For example, when an RGB-D camera is used, the CPU 110 adds depth information to the two-dimensional coordinates obtained above so that the three-dimensional coordinates of the workpiece W, components, and the skeletal posture of the worker can be obtained as the coordinates of the second camera 400.

When a two-dimensional camera is used, the CPU 110 can detect the same point using a plurality of the second cameras 400, 400, . . . . As a result, the three-dimensional coordinates of the workpiece W, components, and the skeletal posture of the worker can be obtained by using trigonometrical survey or the like.

Using the second transformation matrix, the CPU 110 transforms the coordinates of each detection result from the viewpoint of second camera 400 into the world coordinates (step S142).

The CPU 110 creates three-dimensional data representing all of these positions, postures and states are created based on the data on the position of the workpiece W, or components, and the skeletal posture or state of the worker acquired by the image from the first camera 300 and the data on the position of the workpiece W, or components, and the skeletal posture or state of the worker acquired by the image from the second camera 400 (step S143). Note that if the data on the different positions, postures, and states of the same component is obtained from the image from the first camera 300 and the image from the second camera 400, it is preferable to give priority to the position, posture, and state obtained from the image of the first camera 300 at a position close to the part and the operator's hand. Because the first camera 300 is positioned close to the workpiece W, components, and worker's hand, which are more important for understanding the situation.

Returning to FIG. 3, the CPU 110 determines the next process for the workpiece W, or components according to the control data for various tasks based on the date of the position of the workpiece W, components or the data of the skeletal posture or state of the worker (step S150).

The CPU 110 transmits a control command to robot 200 via the communication interface 160 (step S152).

Note that if the first camera 300 has been calibrated (calculated the transformation matrix) in advance and the camera position/posture does not change, the process of step S136 is unnecessary. Further, even when the first camera 300 is attached to the robot 200 or the like and moves, if the position/posture of the first camera 300 can be accurately calculated, the process of step S136 is likewise unnecessary because the transformation matrix obtained by the calibration can be corrected according to the position and posture of the camera 300.

Furthermore, if the transformation matrix can be calculated even once in the second camera 400, even if the position/posture of the first camera 300 changes thereafter, it is possible to estimate the position/posture of the first camera 300 and correct the acquired transformation matrix by the analysis using an acceleration sensor or the analysis of the image change. Therefore, when the AR marker can be detected, the transformation matrix is calculated in step S138, and when it cannot be detected, the acquired transformation matrix may be corrected by self-position estimation instead of the processing of step S138.

Second Embodiment

In the above embodiments, the data from the first camera 300 and the data from the second camera 400 are always merged. In this embodiment, the data from the first camera 300 and the data from the second camera 400 are used when the position and posture of the second camera 400 are stable. Conversely, if the second camera 400 is moving or vibrating, the reliability of the data obtained using both images may be low. In this case, the position of the workpiece W or components, or the skeletal posture or states of the worker is determined based only on the image from the first camera 300.

In this embodiment, the second camera is equipped with an acceleration sensor 470, a vibration sensor, and the like.

As shown in FIG. 6, the CPU 110 specifies the position of a workpiece or a component, or the skeletal posture or states of the worker (steps S131 to S134). When the second camera 400 is vibrating or when the position or posture of the second camera 400 is changing (YES in step S212), the CPU 110 uses the acceleration sensor 470 to specify the position, and the like based on the images of one or more the first cameras 300, 300 . . . (steps S131 to S134).

When the vibration of second camera 400 is small and the change in position and posture is also small (NO in step S212), the CPU 110 executes the process from step S120.

However, regardless of the form using the acceleration sensor 470, the CPU 110 may execute the process from step S131 when there is a large change in the captured image of the second camera 400 (YES in step S212). And when the change in the image captured by the second camera 400 is small (NO in step S212), the process from step S120 may be executed.

Alternatively, if the change in the first camera 300 is greater than that in the second camera 400 (YES in step S212), the CPU 110 may execute the process from step S120. If the change in the first camera 300 is smaller than that in the second camera 400 (NO in step S212), the process from step S131 may be executed.

In the present embodiment, when there is a high possibility that the accuracy of the second camera 400 is low (YES in step S212), the CPU 110 does not activate the second camera 400 or does not allow it to capture images or does not allow it to send the images. As a result, consumption of the battery 450 can be suppressed.

Third Embodiment

Alternatively, referring to FIG. 7, the CPU 110 may cause the second camera 400 to capture images, or may merge the data from the first camera 300 and the data from the second camera 400, based on the image of first camera 300, when the ratio at which parts such as the worker's head and body occupy the image is larger than a predetermined thresh and the ratio at which the hands and arms occupy the image is smaller than a predetermined thresh (YES in step S312).

Alternatively, instead of or in addition to the vibration determination, the CPU 110 may cause the second camera 400 to shoot, or may merge the detection result of the first camera 300 and the detection result of the second camera 400, when the position of the second camera 400 is a predetermined position, such as between the position of the workbench and the first camera 300.

In other words, when the height of the second camera 400 is lower than that of the first camera 300, the CPU 110 may cause the second camera 400 to shoot, or may merge the detection result of the first camera 300 and the detection result of the second camera 400. And when the height of the second camera 400 is higher than that of the first camera 300, the CPU 110 may not use the detection result of the second camera 400.

Alternatively, when the posture of the second camera 400 is in a predetermined direction, for example, when the second camera 400 is directed downward, the CPU 110 may cause the second camera 400 to capture data, or may merge the detection result of the first camera 300 and the detection result of the second camera 400.

In addition, the CPU 110 may determine whether to merge the detection result of the first camera 300 and the detection result of the second camera 400 on the basis of the coverage range of the target area (hidden, out of sight), the reliability of the self-position estimation of the second camera 400 (the amount of change in the position/posture is large after the marker could last detected, etc.), and the image quality (defocusing, overexposure/underexposure), etc.

Fourth Embodiment

In the above embodiment, the data from the first camera 300 and the data from the second camera 400 are merged. However, when a predetermined condition is satisfied, the second camera 400 may acquire the data on the position of a workpiece or a component, or the skeletal posture or states of the worker, and when the predetermined condition is not satisfied, the first camera 300 may acquire the data on the position of a workpiece or a component, or the skeletal posture or states of the worker.

For example, referring to FIG. 8, the CPU 110 starts capturing data by first camera 300 (step S110).

Based on the image of the first camera 300, the CPU 110 determines whether the ratio at which parts such as the worker's head and body occupy the image is larger than a predetermined threshold or whether the ratio at which the hands and arms occupy the image is smaller than a predetermined threshold (step S312).

If the ratio at which the hands and arms occupy the image is smaller than a predetermined threshold, or if the ratio at which the hands and arms occupy the image is larger than a predetermined threshold (NO in step S312), the CPU 110 acquires information as to where the position of the first camera 300 is set in the world coordinate system (step S131). In the case of a camera fixed to a workbench, the position and posture of the camera in the world coordinate system are determined in advance. In the case of the camera attached to the robot 200, the CPU 110 calculates the position, posture, angle of view, and the like of the camera 300 in the world coordinate system based on the position and posture of the robot 200 in the world coordinate system and the position and posture of the first camera 300 with respect to the robot 200.

The CPU 110 calculates a first transformation matrix from the coordinates viewed from the first camera 300 to the world coordinate system based on information such as the angle of view of the camera in the world coordinate system (step S132).

Based on the image of the first camera 300, the CPU 110 detects a workpiece W and components and detects the skeletal posture of the worker and the like from the two-dimensional image from the viewpoint of the first camera 300 based on the image of the first camera 300 (step S133).

For example, when a three-dimensional camera is used, the CPU 110 adds depth information to the two-dimensional coordinates obtained above so that the three-dimensional coordinates of the workpiece W, components, and the skeletal posture of the worker can be obtained as the coordinates of the first camera 300.

When a two-dimensional camera is used, the CPU 110 can detect the same point using a plurality of the first cameras 300, 300, . . . . As a result, the three-dimensional coordinates of the workpiece W, components, and the skeletal posture of the worker can be obtained by using trigonometrical survey or the like.

Using the first transformation matrix, the CPU 110 transforms the coordinates of the workpiece W, components, and the skeletal posture of the worker from the viewpoint of the first camera 300 into the world coordinates (step S134).

The CPU 110 determines the next process for the workpiece W, or components according to the control data for various tasks based on the state of the workpiece W, components and the skeletal posture or state of the worker (step S150).

The CPU 110 transmits a control command to robot 200 via communication interface 160 (step S152).

On the other hand, if the ratio where parts such as the worker's head and body occupy the image is larger than the predetermined threshold and the ratio where the worker's hands and arms occupy the image is smaller than the predetermined threshold (YES in step S312), the CPU 110 determines whether the second camera 400 is vibrating or changing its position or posture (step S212).

If the second camera 400 vibrates or changes its position or orientation (YES in step S212), the process from step S131 is executed.

When the second camera 400 is stable (NO in step S212), the CPU 110 recognizes AR marker M from the image from the first camera 300 (step S136). Note that if the first camera 300 has been previously calibrated (transformation matrix calculation), the process of steps S136 and S138 is unnecessary.

The CPU 110 calculates the AR marker-based position and posture of the first camera 300 based on the position and shape of the AR marker M viewed from the first camera 300 (step S137).

Then, the CPU 110 recognizes AR marker M from the image from the second camera 400 (step S138).

The CPU 110 calculates the AR marker-based position and posture of the second camera 400 based on the position and shape of the AR marker M viewed from the second camera 400 (step S139).

The CPU 110 calculates a second transformation matrix from the coordinates viewed from the second camera 400 to the world coordinates (step S140). More specifically, in the present embodiment, the CPU 110 calculates the first transformation matrix by executing steps S131 and S132, and then calculates the second transformation matrix from the first transformation matrix based on the position and posture of the second camera 400 relative to the position and posture of the first camera 300.

Based on the image of the second camera 400, the CPU 110 detects the workpiece W and components and detects the skeletal posture of the worker and the like from the two-dimensional image from the viewpoint of the second camera 400 based on the image of the second camera 400 (step S141).

For example, when a three-dimensional camera is used, the CPU 110 adds depth information to the two-dimensional coordinates obtained above so that the three-dimensional coordinates of the workpiece W, components, and the skeletal posture of the worker can be obtained as the coordinates of the second camera 400.

When a two-dimensional camera is used, the CPU 110 can detect the same point using a plurality of the second cameras 400, 400 . . . . As a result, the three-dimensional coordinates of the workpiece W, components, and the skeletal posture of the worker can be obtained by using trigonometrical survey or the like.

Using the second transformation matrix, the CPU 110 transforms the coordinates of the workpiece W, components, and the skeletal posture of the worker from the viewpoint of the second camera 400 into the world coordinates (step S142).

The CPU 110 executes the process from step S150.

In addition, in the present embodiment as well, in addition to the mode in which the acceleration sensor 470 is used to determine whether there is vibration, the CPU 110 may execute the process from step S131 when there is a large change in the captured image of the second camera 400 (YES in step S212). And when the change in the image captured by the second camera 400 is small (NO in step S212), the process from step S120 may be executed.

Alternatively, if the change in the first camera 300 is greater than that in the second camera 400 (YES in step S212), the CPU 110 may execute the process from step S120. If the change in the first camera 300 is smaller than that in the second camera 400 (NO in step S212), the process from step S131 may be executed.

Alternatively, or in addition to the above determination, the CPU 110 determines whether the position of the second camera 400 is at a predetermined position, such as the position between the workbench and the first camera 300. If so, the process from step S120 may be executed, and if not, the process from step S131 may be executed.

In other words, the CPU 110 may execute the process from step S120 if the height of the second camera 400 is lower than that of the first camera 300, and otherwise may execute the process from step S131.

Alternatively, the CPU 110 may execute the process from step S120 if the posture of the second camera 400 is in a predetermined direction, for example, if the second camera 400 is directed downward, and otherwise may execute the process from step S131.

In addition, the CPU 110 may determine whether to execute the process from step S120 or from step S131 on the basis of the coverage range of the target area (hidden, out of sight), the reliability of the self-position estimation of the second camera 400 (the amount of change in the position/posture is large after the marker could last detected, etc.), and the image quality (defocusing, overexposure/underexposure), etc.

Sixth Embodiment

Other devices may perform a part or all of the role of each device such as the control device 100 and the robot 200 of the robot control system 1 of the above embodiment. For example, the role of the control device 100 may be partially played by the robot 200, the role of the control device 100 may be played by a plurality of personal computers, or the information processing of the control device 100 may be performed by a server on the cloud.

<Review>

In the above embodiments, a robot control system is provided that includes a robot, at least one first camera attached or fixed to the robot, a second camera attached to a worker and a control device. The control device controls the robot by specifying a position of a workpiece or a component, or a skeletal posture or states of the worker based on an image of the first camera and an image of the second camera.

Preferably, when a predetermined condition is satisfied, the control device specifies the position of the workpiece or the component, or the skeletal posture or states of the worker based on the image of the at least one first camera and the image of the second camera, and when the predetermined condition is not satisfied, the control device specifies the position of the workpiece or the component, or the skeletal posture or states of the worker based on the image of the at least one first camera.

Preferably, the second camera includes an acceleration sensor. When a change in the position or the posture of the second camera is less than a predetermined degree as the predetermined condition, the control device specifies the position of the workpiece or the component, or the skeletal posture or states of the worker based on the image of the at least one first camera and the image of the second camera, and when the change in the position or the posture of the second camera is larger than the predetermined degree, the control device specifies the position of the workpiece or the component, or the skeletal posture or states of the worker based on the image of the at least one first camera.

Preferably, as the predetermined condition, when a part of a work target cannot be shot from the at least one first camera due to the worker's body or head, the control device specifies the position of the workpiece or the component, or the skeletal posture or states of the worker based on the image of the at least one first camera and the image of the second camera, and when the entire work target can be shot from the at least one first camera, the control device specifies the position of the workpiece or the component, or the skeletal posture or states of the worker based on the image of the at least one first camera.

In the above embodiments, a control device is provided that includes a communication interface between a first camera, a second camera, and a robot; a memory; and a processor. The processor controls the robot by specifying a position of a workpiece or a component, or a skeletal posture or states of a worker based on an image of the first camera and an image of the second camera.

In the above embodiments, a robot control system is provided that includes a robot, a fixed camera or at least one first camera attached to the robot, a second camera attached to a worker and a control device. The control device controls the robot, when a predetermined condition is satisfied, by specifying a position of a workpiece or a component, or a skeletal posture or states of the worker based on an image of the second camera, and the control device controls the robot, when the predetermined condition is not satisfied, by specifying the position of the workpiece or the component, or the skeletal posture or states of the worker based on an image of the at least one first camera.

In the above embodiments, a robot control system is provided that include a communication interface between a first camera, a second camera, and a robot, a memory and a processor. The processor controls the robot, when a predetermined condition is satisfied, by specifying a position of a workpiece or a component, or a skeletal posture or states of a worker based on an image of the second camera, and the control device controls the robot, when the predetermined condition is satisfied, by specifying the position of the workpiece or the component, or the skeletal posture or states of the worker based on an image of the at least one first camera.

It should be considered that the embodiments disclosed this time are illustrative in all respects and not restrictive. The scope of the present invention is indicated by the scope of the claims rather than the above description, and is intended to include all modifications within the scope and meaning equivalent to the scope of the claims.

REFERENCE SIGNS LIST

1: robot control system
100: control device
110: CPU
120: memory
130: display
140: operation unit
150: speaker
160: communication interface
200: robot
300: first camera
400: second camera
450: battery
460: wireless antenna
470: acceleration sensor

What is claimed is:

1. A robot control system, comprising:
   a robot;
   at least one first camera attached or fixed to the robot;
   a second camera attached to a worker; and
   a control device configured to:
      control the robot, when part of a work target is blocked from the at least one first camera due to the worker's body, based on an image from the at least one first camera and an image from the second camera, by:
         specifying a position of a workpiece or a component,
         specifying a skeletal posture of the worker, or
         specifying states of the worker;
      or
      control the robot, when an entirety of the work target appears in an image from the at least one first camera, based on an image from the at least one first camera, by:
         specifying a position of the workpiece or the component,
         specifying the skeletal posture of the worker, or
         specifying states of the worker.

2. A robot control system, comprising:
   a robot;
   at least one first camera attached or fixed to the robot;
   a second camera attached to a worker,
      wherein the second camera includes an acceleration sensor; and
   a control device, configured to:
      control the robot, when a change in the position or the posture of the second camera is less than a predetermined degree, based on the image of the at least one first camera and the image of the second camera, by:
         specifying a position of the workpiece or the component,
         specifying the skeletal posture of the worker, or
         specifying states of the worker;
      or
      control the robot, when the change in the position or the posture of the second camera is larger than the predetermined degree, based on the image of the at least one camera, by:
         specifying the position of the workpiece or the component,
         specifying the skeletal posture of the worker, or
         specifying states of the worker.

3. A control device, comprising:
   a communication interface between a first camera, a second camera, and a robot;
   a memory; and
   a processor configured to execute a program stored in the memory:
      control the robot based on an image of the first camera and an image of the second camera by:
         specifying a position of a workpiece or a component,
         specifying a skeletal posture of a worker, or
         specifying states of the worker;
      or
      control the robot, when an entirety of the work target appears in an image from the first camera, based on an image from the first camera, by:
         specifying a position of the workpiece or the component,
         specifying the skeletal posture of the worker, or
         specifying states of the worker.

* * * * *